United States Patent
Klingler

(10) Patent No.: US 9,494,176 B2
(45) Date of Patent: Nov. 15, 2016

(54) CLAMP

(71) Applicant: Scott Klingler, Dallas, TX (US)

(72) Inventor: Scott Klingler, Dallas, TX (US)

(*) Notice: Subject to any disclaimer, the term of this patent is extended or adjusted under 35 U.S.C. 154(b) by 135 days.

(21) Appl. No.: 14/480,694

(22) Filed: Sep. 9, 2014

(65) Prior Publication Data

US 2015/0068010 A1 Mar. 12, 2015

Related U.S. Application Data

(60) Provisional application No. 61/876,053, filed on Sep. 10, 2013.

(51) Int. Cl.
 *F16B 2/18* (2006.01)
 *F16B 2/10* (2006.01)
 *F16B 5/06* (2006.01)

(52) U.S. Cl.
 CPC .............. *F16B 2/185* (2013.01); *F16B 2/10* (2013.01); *F16B 5/0635* (2013.01); *Y10T 24/44017* (2015.01); *Y10T 24/44368* (2015.01); *Y10T 29/49815* (2015.01); *Y10T 29/49826* (2015.01); *Y10T 29/49947* (2015.01)

(58) Field of Classification Search
 CPC .............. F16B 2/02; F16B 2/20; F16B 7/06; F16B 13/00; B25B 1/08; B25B 27/023
 See application file for complete search history.

(56) References Cited

U.S. PATENT DOCUMENTS

| | | | | |
|---|---|---|---|---|
| 3,434,686 | A * | 3/1969 | Aoi | A47L 13/512 211/45 |
| 4,700,437 | A * | 10/1987 | Hoshino | B25B 1/10 24/456 |
| 5,167,405 | A * | 12/1992 | Cayley, Jr. | B23Q 1/0063 248/346.06 |
| 6,889,968 | B1 * | 5/2005 | Wong | B23Q 3/069 269/101 |
| 8,001,872 | B2 * | 8/2011 | Gorrie | B67B 7/18 269/3 |
| 2014/0294496 | A1 * | 10/2014 | Gardiner | F16B 7/1454 403/374.2 |
| 2015/0068010 | A1 * | 3/2015 | Klingler | F16B 2/185 29/426.1 |

* cited by examiner

*Primary Examiner* — Lee D Wilson
(74) *Attorney, Agent, or Firm* — Scott L. Harper; Griffith Bates Champion & Harper LLP

(57) ABSTRACT

The invention disclosed herein generally relates to an improved clamp assembly for attaching two or more objects, such as furniture, tables, desks, dividers or other panel elements together of variable thicknesses. The elements of the clamp assembly invention generally include a clamp body with a clamp stop and clamp spine, a cross-dowel, an actuating screw and a clamp lever. The clamp assembly imparts a compressive clamping force by utilizing a fulcrum-lever arrangement whereby the clamp lever is moved in an arcuate trajectory by rotating the actuating screw in the desired direction as the clamp lever pivots about a fulcrum point. This allows the user to easily place and connect various objects, such as tables, desks, courtesy and privacy panels and another desired object that the user desires to secure in a desired arrangement by imparting a compressive force to the panel element that is to be connected to another panel element.

8 Claims, 7 Drawing Sheets

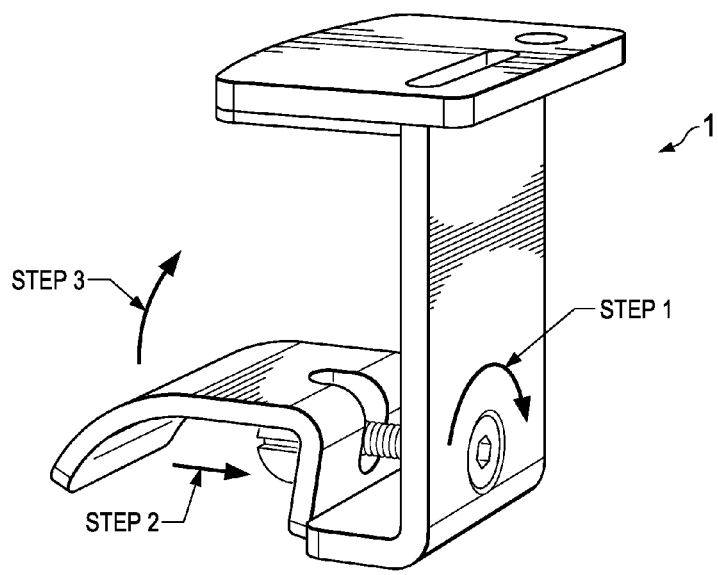
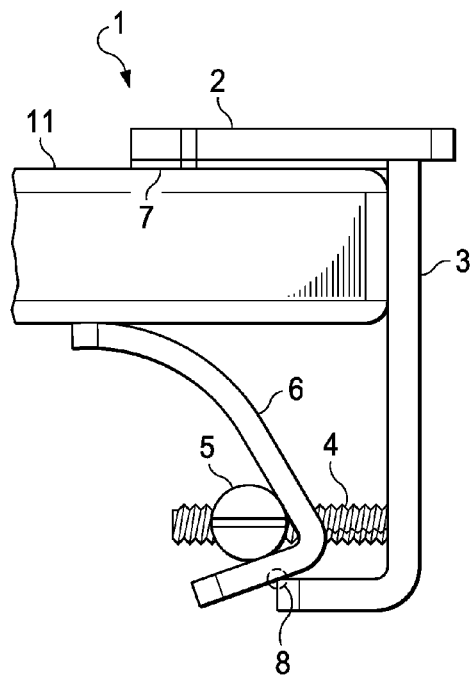
FIG. 3A
FIG. 3B
FIG. 3C

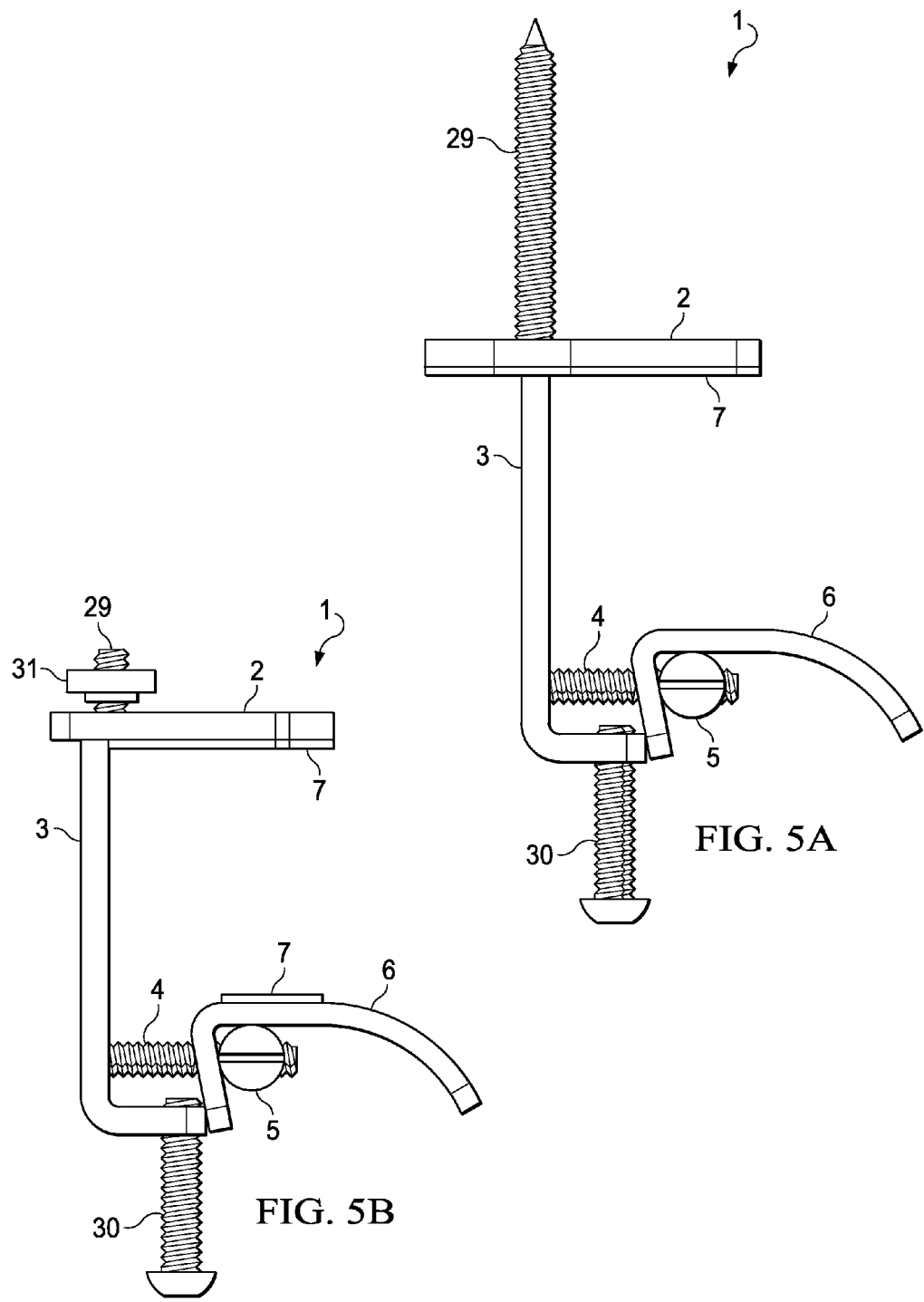

US 9,494,176 B2

CLAMP

CROSS-REFERENCE TO RELATED APPLICATIONS

This application claims the benefit of and priority to U.S. provisional patent application, Ser. No. 61/876,053 filed on Sep. 10, 2013, the disclosure of which is incorporated herein by reference.

BACKGROUND OF THE INVENTION

The present invention relates generally to apparatus and methods for connecting pieces of material together or for connecting two or more objects together. In certain embodiments, the present invention is related to apparatus and methods for connecting two or more pieces of furniture, tables or office equipment together in desired configurations. More specifically, the invention disclosed herein is directed to a novel clamp and method for connecting furniture, tables, privacy panels or other office equipment, or any other materials or objects to be connected securely together in a desired configuration.

Generally, various types of table and desk units are made available which improve the amount of workspace available to one in a typical home or office environment. Such units may include a privacy panel or courtesy panel permanently fixed to the unit that prohibits the movement or reconfiguration of the unit into different locations or arrangements as dictated by office space needs. When the time comes to disassemble and move these units, one must remove the screws or nails holding the panels in contact with the unit which typically results in damage to the unit as well as the appearance of unsightly holes and scratches to the surfaces of the furniture unit. In other instances, the hardware attaching the various panels to the unit is typically located underneath the unit or panel elements connected to the unit which is difficult to access and manipulate for assembling or disassembling the unit from the panel elements.

It is known in the art to utilize various clamping means to impart a straight-line or axial force between the desks, panels or tables being connected together. Such clamping means, such as the generally known C-clamp requires the use of a screw or knob which is turned to bring the ends of the clamp together to impart an axial compressive force between the desk, panel and/or table surfaces disposed between the ends of the C-clamp. It is often quite difficult, if not impossible, to position the clamp in a location suitable to allow the user to easily manipulate the clamp screw to secure the unit and panel elements together in a connected fashion. Such clamps tend to protrude from the assembly at various points, either internally or externally, affecting the aesthetic appearance of the desk and panel assembly and may cause injury to a person using the assembly where they may inadvertently contact those portions of the clamp protruding from the assembly. In similar manner, the user's clothing may be caught by the clamp hardware protruding from the clamp assembly causing damage to the person's clothing.

SUMMARY OF THE INVENTION

The invention disclosed herein generally relates to an improved clamp assembly for attaching two or more objects, such as furniture, tables, desks, dividers or other panel elements together of variable thicknesses. The elements of the clamp assembly invention are seen in the attached drawings and generally include a clamp body, a cross-dowel, an actuating screw and a clamp lever. In various alternative embodiments, the clamp assembly may also include a nut plate, a "C" clamp shaped clamp body, and/or an "L" shaped clamp body as may be required by various installation conditions.

The clamp assembly imparts a compressive clamping force by utilizing a fulcrum-lever arrangement whereby the clamp lever is moved in an arcuate trajectory by turning the actuating screw in the desired direction as the clamp lever pivots at the fulcrum point located on a surface of the clamp spine. This allows the user to easily place and connect various objects, such as tables, desks, courtesy and privacy panels (generally referred to herein as "panel elements") and any other desired object which the user desires to secure in a desired arrangement by imparting a compressive force to the panel element which is to be connected to another panel element. A clamp pad may also be attached to the contact surfaces of the clamp body and/or clamp lever to protect the surfaces of the panel element being clamped and/or to impart additional frictional force to the panel element to prevent or reduce and/or resist relative motion between the connected panel elements.

BRIEF DESCRIPTION OF THE DRAWINGS

The foregoing aspects and many of the features and advantages of the invention will become readily appreciated, as they become better understood by reference to the following detailed description, when taken in conjunction with the accompanying drawings, wherein:

FIGS. 3A-3C show a perspective view of the clamp assembly action and side views of various depictions of the clamp assembly shown attached to panel elements of various sizes of the disclosed invention;

FIGS. 5A-5C show side views of various embodiments of the clamp assembly with various connectors for attaching a panel element to the clamp assembly of the disclosed invention; and, FIGS. 6A-6B are depictions of one or more clamp assemblies attached to a panel element and a second panel element according to the disclosed invention.

DETAILED DESCRIPTION OF THE INVENTION

As described herein and shown in the accompanying drawings and photographic drawings, the inventive embodiments disclosed herein include an apparatus and method for detachably securing two objects, such as panel elements together with a novel fulcrum-lever clamping assembly.

Figure 1:
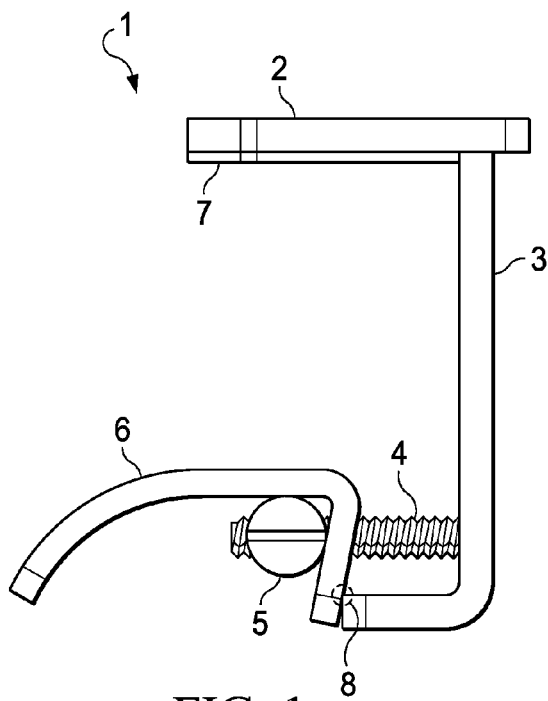
FIG. 1 is a side plan view of an embodiment of the clamp assembly of the disclosed invention.

FIG. 1 discloses an embodiment of the clamp assembly according to the present inventive disclosure. The clamp assembly 1 includes clamp stop 2, clamp spine 3, actuating screw 4, cross dowel 5, and clamp lever 6. A clamp pad 7 may be attached to a surface of clamp stop 2 as shown. The edge of the lower end of clamp spine 3 acts as the fulcrum or pivot point 8 about which clamp lever 6 rotates and translates as the user turns the actuating screw 4 resulting in the bi-directional movement of cross-dowel 5. As cross-dowel 5 is drawn toward the clamp spine 3, it causes the clamp lever 6 to rotate about a fulcrum point created by the lower edge of the clamp spine 3 and towards the clamp pad 7 affixed on the clamp stop 2. The operation of the clamp assembly 1 is more fully described in the disclosure below.

Figure 2:
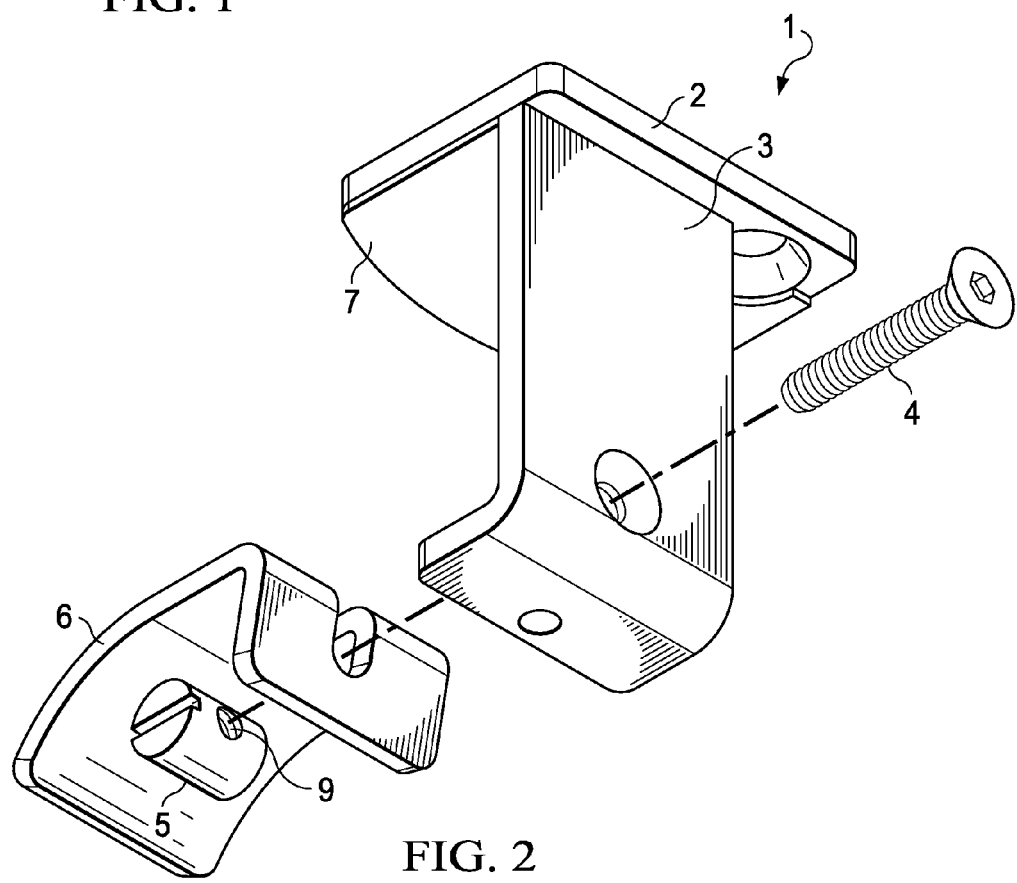
FIG. 2 is a perspective exploded view of an embodiment of the disclosed invention.

FIG. 2 is a perspective view of an embodiment of the clamp assembly. Clamp stop 2 and clamp spine 3 may be manufactured as a monolithic piece or two manufactured articles connected by welding or other connection means as known in the art. An orifice is formed in clamp spine 3 so as to allow actuating screw 4 to pass through clamp spine 3 and clamp lever 6 and threadedly connect with cross-dowel 5 through an orifice 9 formed therein. A clamp pad 7 is attached to a surface of clamp stop 2 to aid in securing the panel elements to be connected together by the clamp assembly 1.

FIGS. 3A-3C depict the method by which the clamp assembly operates and attaches to a panel element as disclosed herein. Referring to FIG. 3A, the clamp assembly 1 is shown in the unclamped position. At Step 1, the user turns the actuating screw in a clockwise manner with the effect of the actuating screw drawing the cross-dowel toward the clamp spine as shown at Step 2. As the user turns the actuating screw, the cross-dowel begins traveling toward the clamp and the lower edge of the clamp spine provides a fulcrum about which the clamp lever rotates in turn raising the clamp lever toward the opposing clamp stop as shown at Step 3.

FIG. 3B shows the clamp assembly in the clamped position about panel element 11. In this embodiment, the user turns actuating screw 4 to draw in cross-dowel 5 toward clamp spine 3 in turn causing clamp lever 6 to pivot about fulcrum 8. As actuating screw 4 is turned, cross-dowel 5 continues to raise clamp lever 6 towards opposing clamp stop 2 until the panel element 11 is secured between the surfaces of clamp pad 7 and clamp lever 6 at clamp lever contact point 10. In this depiction, panel element 11 is secured by the clamp assembly to another panel assembly, wall or other fixed element (not shown) that is attached above or to the clamp stop 2. In the event the user wishes to detach panel assembly 11, the user simply counter-rotates actuating screw 4 thereby moving cross-dowel 5 away from clamp spine 3 and causing clamp lever 6 to rotate and move away from opposing clamp stop 2 and releasing panel element 11.

FIG. 3C demonstrates the similar features and use of the clamp assembly with a thin panel element 11 as opposed to a thicker panel element depicted in FIG. 3B. The embodiment disclosed in FIGS. 3A-3C is typically used to secure panel elements with thicknesses ranging from about ⅝ to 1½ inches, although the clamp assembly may be used with a variety of elements with differing dimensions as required by the user. As can be seen in comparing FIGS. 3B and 3C, the clamp assembly is operable to provide a secure connection between panel elements of varying size and thickness. In FIG. 3C, a thin panel element 11 is shown in the secured position. In this embodiment, the user turns actuating screw 4 to draw in cross-dowel 5 toward clamp spine 3, in turn causing clamp lever 6 to pivot about fulcrum point 8. As actuating screw 4 is turned, cross-dowel 5 continues to raise clamp lever 6 towards opposing clamp stop 2 until the panel element 11 is secured between the surfaces of clamp pad 7 and clamp lever 6. In this depiction, the clamp assembly now secures panel element 11 to another panel assembly, wall or other fixed element (not shown) that is attached above or to the clamp stop 2.

Figure 4A:
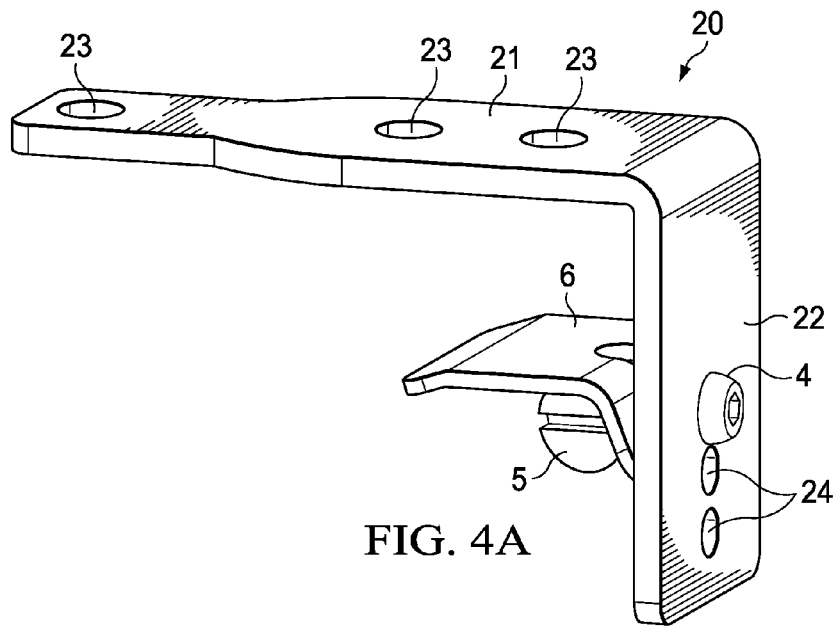
FIGS. 4A-4B depict a perspective view of an embodiment of the clamp assembly and a side view of an embodiment of the clamp assembly attached to a table and panel element.
Figure 4B:
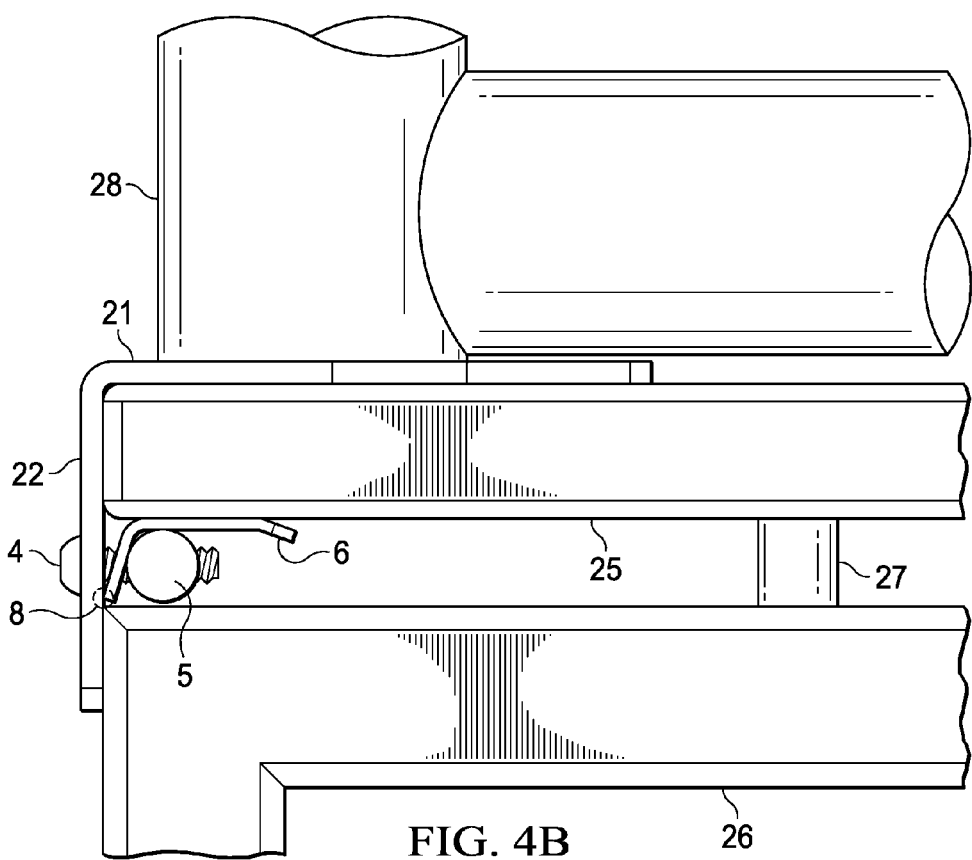

FIGS. 4A and 4B depict an embodiment of the clamp assembly which may be utilized to connect an upper panel element to a table or other element which has no ability to utilize a standard C-clamp due to limited space and an inability to clamp to the bottom table or other element surface. Turning to FIG. 4A, an embodiment of clamp assembly 20 is shown. Clamp assembly 20 includes an elongate clamp stop 21 with attachment holes 23 provided and spaced along the length of the clamp stop 21 whereby clamp stop 21 may be fixed to another panel element. Actuating screw 4 is threadedly connected to cross-dowel 5 which acts to support and cause clamp lever 6 to move up or down in elevation relative to clamp stop 21, while clamp lever 6 pivots about fulcrum point 8 as actuating screw 4 is turned in a clockwise or counter-clockwise manner. Attachment holes 24 provide variable thickness adjustment sites to which clamp body 20 may be fixed to another panel element. Attachment holes 24 may also serve as variable thickness adjustment sites for insertion of actuating screw 4 so as to accommodate panel elements of various thicknesses and providing for the adjustable positioning of clamping lever 6 depending on the thickness of the panel element being secured by clamp assembly 20.

FIG. 4B depicts an embodiment of the clamp assembly securing a panel element 28 to a table element 25. In this embodiment, fastening means such as screws, nails, glue or other fasteners as known in the art, connect panel element 28 to clamp stop 21 of the clamp assembly. As background, table element 25 is secured to support element 26 via stud 27 as is known in current modern desk furniture construction. Panel element 28 is placed in the desired location in relative proximity to table element 25 whereby table element 25 is positioned between clamp stop 21 and clamp lever 6. The user turns the actuating screw 4 resulting in clamp lever 6 rotating in arcuate fashion towards clamp stop 21, as cross-dowel 5 is drawn towards clamp spine 22, until clamp lever 6 places sufficient pressure against table element 25 which is restricted from movement by the compressive force exerted on table element 25 between clamp stop 21 and clamp lever 6.

In this configuration, panel element 28 and table element 25 are connected together by the user simply positioning panel element 28 in the appropriate location relative to table element 25 and turning the actuating screw 4 from an easily accessible location. There is no need for the user to crawl up under the panel assembly in order to manipulate actuating screw 4 or other hardware that is typically difficult to manipulate in such confined spaces. To detach panel element 28 from the table element 25, the user simply counter-rotates actuating screw 4 thereby removing the compressive force placed on table element 25 by the clamp assembly 1 and providing for easy detachment and removal of panel element 28 therefrom.

FIGS. 5A and 5B depict embodiments of the present invention that include additional connecting means, such as screws 29, 30 and tab 31, for attaching panel elements to the clamp assembly 1 at various locations including the clamp stop 2 and clamp spine 3. However, it is contemplated that additional connecting means, such as bolts, nails or other connectors capable of attaching a panel element to the clamp assembly 1 are contemplated by the applicant and are known in the art to those of ordinary skill.

Turning to FIG. 5A, screw 29 and/or screw 30 may be used to attach the clamp assembly 1 to a fixed element, table, surface, or other panel element (not shown). FIG. 5B discloses an embodiment of the invention that includes screw 29, screw 30 and a tab 31 secured by screw 29 to clamp stop 2. Tab 31 allows for the clamp assembly to be detachably secured to a modular panel element that includes a track pathway (not shown) and into which the tab 31 may be inserted and positioning the clamp assembly as the user desires. After the user positions and secures the clamp assembly 1 at the desired location, the user rotates screw 29 to secure the clamp assembly to the modular panel element (not shown). As previously described herein, the user may then position a second panel element between clamp stop 2 and clamp lever 6 and by rotating the actuation screw 4 secure the second panel element to the modular panel element (not shown).

The embodiment in FIG. 5B also discloses additional clamp pads 7 located on various surfaces of clamp stop 2 and clamp lever 6 which may act to provide a non-marring padded surface to protect the surface of the table element or panel element secured by the clamp assembly 1. In alternative embodiments, teeth, ridges, tabs or other score marks may be formed into the contact surfaces of the clamp assembly 1, including clamp stop 2 and/or clamp lever 6 to provide additional friction forces to prevent or reduce the slippage or movement of the table element (not shown), and panel element secured by the clamp assembly 1.

Figure 5C:
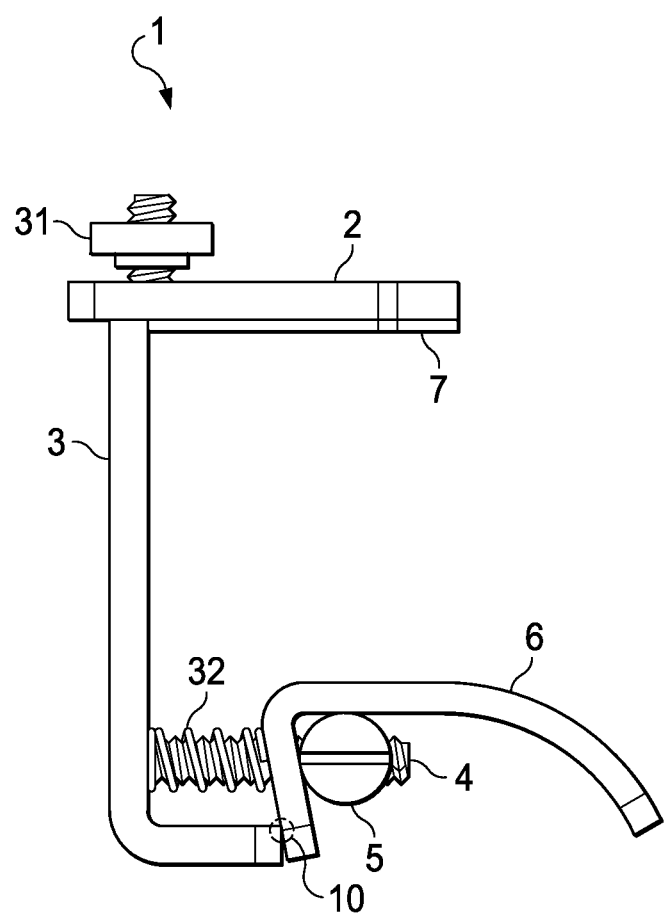

FIG. 5C depicts an embodiment of the invention that includes spring 32 surrounding actuation screw 4 so as to provide an axial stability force between clamp spine 3 and clamp lever 6. The axial force imparted by spring 32 acts to constantly push clamp lever 6 in contact with clamp spine 3 at the fulcrum or pivot point 10 thereby substantially preventing transverse rotation of the clamp lever 6 which may result in the clamp lever 6 moving out of the desired position for pivoting about the fulcrum or pivot point 10. As actuation screw 4 is rotated in a clockwise or counter-clockwise motion thereby moving cross-dowel 5 in the desired direction, spring 32 acts to impart sufficient axial force between clamp spine 3 and clamp lever 6 to prevent transverse rotational motion between clamp spine 3 and clamp lever 6 relative to the fulcrum or pivot point 10.

Figure 6A:
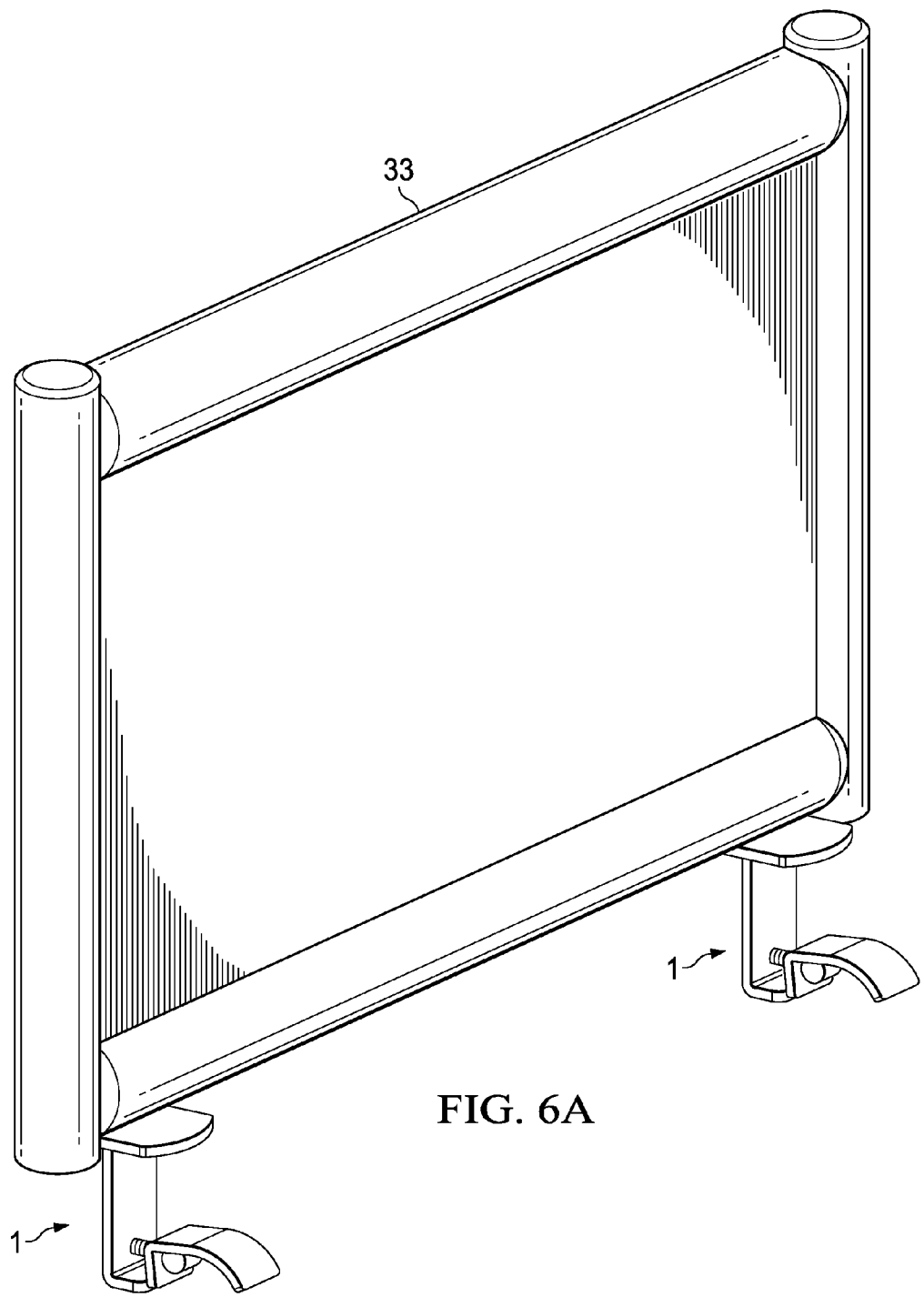
Figure 6B:
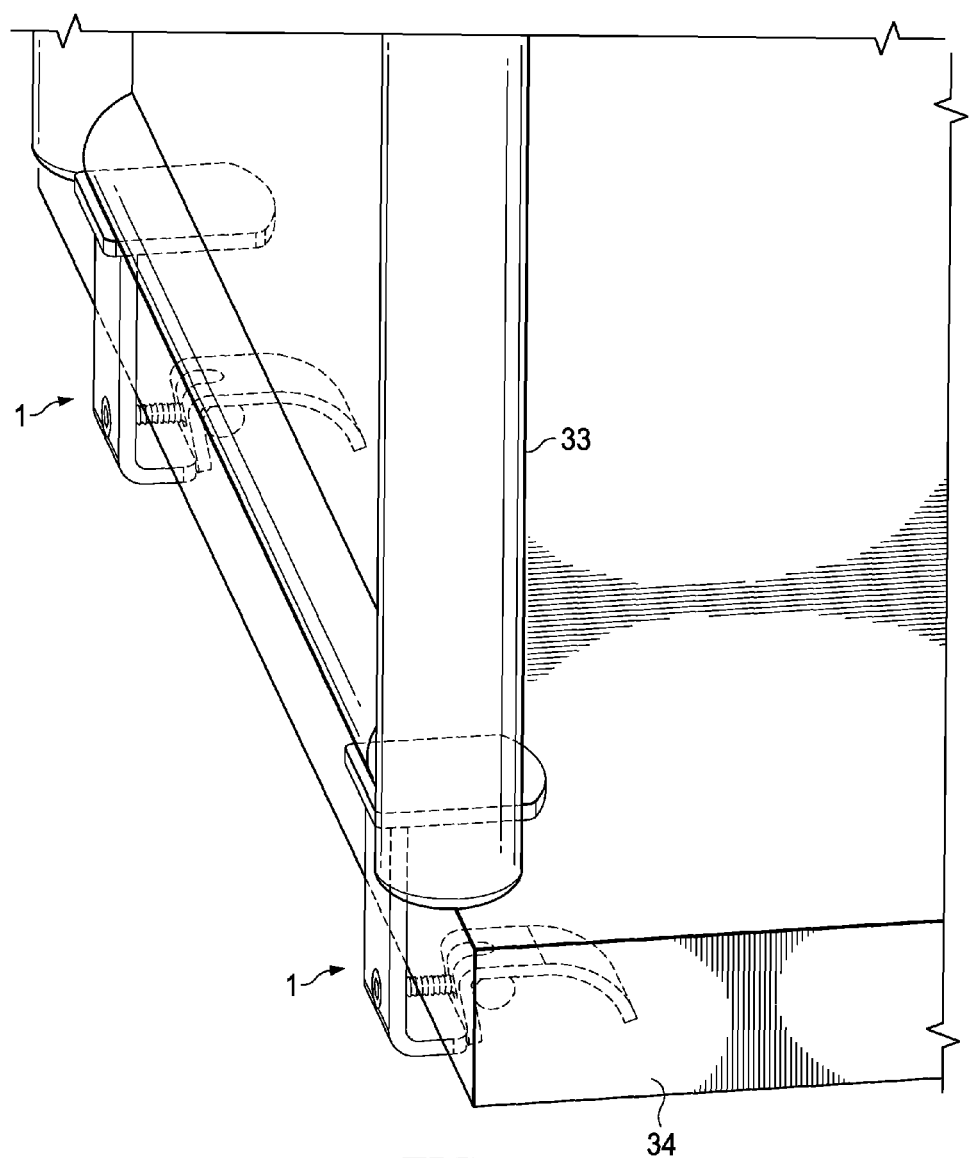

FIGS. 6A and 6B disclose various operative embodiments of the clamp assembly disclosed herein as used in a typical working environment. Turning to FIG. 6A, two clamp assemblies 1 are shown attached to divider panel element 33 prior to connection with another panel element, table or object. FIG. 6B shows divider panel element 33 attached to table 34 with one or more clamp assemblies 1. As can be readily seen from the invention disclosed herein, the divider panel element 33, or any other element or object the user may wish to attach to a desk, table or object, may readily and easily be connected together using the various clamp assembly embodiments as shown and described in this application.

The terms, descriptions and figures used herein are set forth by way of illustration only and are not meant as limitations. Those skilled in the art will recognize that many variations of the clamp assembly are possible within the spirit and scope of the invention in which all terms are meant in their broadest, reasonable sense unless otherwise indicated. The description and utilization of the clamp assembly set forth herein is not meant to be limited to any particular industry or use, and those of skill in the art will recognize the disclosed invention may be applied in other industrial arts such as the medical arts, mechanical arts and technological arts. Any headings utilized within the description are for convenience only and have no legal or limiting effect.

I claim:

1. A clamp assembly apparatus, comprising:
a clamp stop;
a clamp spine with at least one orifice of sufficient diameter in the clamp spine through which a partial length of an actuating screw may be passed;
a curved clamp lever with an orifice of sufficient diameter through which a partial length of the actuating screw passes and is threadedly connected to a cross-dowel resting against a surface of the clamp lever and wherein a surface of the clamp spine forms a fulcrum about which the clamp lever rotates.

2. The apparatus of claim 1, further comprising:
a clamp pad in contact with the clamp stop.

3. The apparatus of claim 1, further comprising:
an attachment hole in the clamp stop for attaching a panel element to the clamp assembly.

4. The apparatus of claim 1, further comprising:
a spring surrounding a partial length of the actuating screw and positioned between the clamp lever and clamp spine.

5. The apparatus of claim 1, further comprising:
a tab secured to the clamp stop for attaching a panel element to the clamp assembly.

6. The apparatus of claim 1, further comprising:
a clamp pad in contact with the clamp lever.

7. The apparatus of claim 1 wherein the clamp stop includes teeth, ridges, tabs or score marks located on a surface of the clamp stop.

8. The apparatus of claim 1 wherein the clamp lever includes teeth, ridges, tabs or score marks located on a surface of the clamp lever.

* * * * *